United States Patent [19]

Brown

[11] Patent Number: 4,533,970

[45] Date of Patent: Aug. 6, 1985

[54] SERIES CURRENT LIMITER

[75] Inventor: Leland T. Brown, Phoenix, Ariz.

[73] Assignee: Motorola, Inc., Schaumburg, Ill.

[21] Appl. No.: 507,654

[22] Filed: Jun. 27, 1983

[51] Int. Cl.³ .................... H02H 3/08; H02H 3/087
[52] U.S. Cl. .................................. 361/58; 361/93; 323/277
[58] Field of Search ............... 361/93, 88, 58; 323/276, 277, 311, 908; 307/568, 550, 567

[56] References Cited

U.S. PATENT DOCUMENTS 3,916,220 10/1975 Roveti .............................. 307/568

Primary Examiner—A. D. Pellinen
Assistant Examiner—Hong K. Choe
Attorney, Agent, or Firm—Joe E. Barbee

[57] ABSTRACT

Field effect transistors are used in a series current limiter circuit. The field effect transistors are depletion type transistors and are interconnected in a manner to decrease conduction when an overvoltage or overcurrent condition is sensed. Biasing resistors are used to maintain the transistors in a non-conductive state until the overvoltage or overcurrent condition is removed.

7 Claims, 3 Drawing Figures

SERIES CURRENT LIMITER

This invention relates, in general, to protection circuits, and more particularly, to a two terminal series circuit for limiting current flow.

It is often desirable to limit the amount of current flowing in a circuit. There are various ways of limiting the current such as by using series resistance, fuzes, or even series circuits with active components like in a series regulator. It is usually desirable that the current limiting device be self-resetting so that once the disturbance that causes the increased current disappears the circuit can resume normal operation without human intervention. It is also desirable, in many cases, that the series current limiting device not insert too much resistance in the circuit thereby causing an undesirable voltage drop during normal operation.

Electrical protection is extremely desirable in electronic PBXs, key telephone systems, electronic telephones as well as the forecast emergence of an Integrated Services Digital Network (ISDN). The end terminal equipment in such systems is frequently exposed to a number of sources of potentially destructive interference such as lightning, power system, equipment power service, station protector operation, and local switching transients. The end terminal equipment will frequently use shunt protection such as gas tube arrestors, air gap carbons, diodes or the such in order to protect the end terminal from large voltage transients. In order to reduce overcurrent transients a series resistor of relatively low resistance is placed between the possible source of overvoltage or current and the shunt protection device. The present invention readily lends itself to being substituted for the series resistor.

Accordingly, an object of the present invention is to provide an improved series current limiter circuit which is self-resetting.

Another object of the present invention is to provide a circuit that has a low series resistance for normal operating voltage and currents but will increase its series resistance to a relatively high value when it is overstressed by voltage and/or current.

SUMMARY OF THE INVENTION

The above and other objects and advantages of the present invention are achieved by providing a series current limiter which is fully self-resettable. In a preferred embodiment, the present circuit is a two terminal device having field effect transistors connected in series between the terminals. Preferably at least two transistors of opposite conductivity type are used. The transistors are preferably depletion type devices.

The subject matter which is regarded as the invention is set forth in the appended claims. The invention itself, however, together with further objects and advantages thereof, may be better understood by referring to the following detailed description taken in conjunction with the accompanying drawings.

The exemplifications set out herein illustrate the preferred embodiments of the invention in one form thereof, and such exemplifications are not to be construed as limiting in any manner.

DETAILED DESCRIPTION OF THE DRAWINGS

Figure 1:
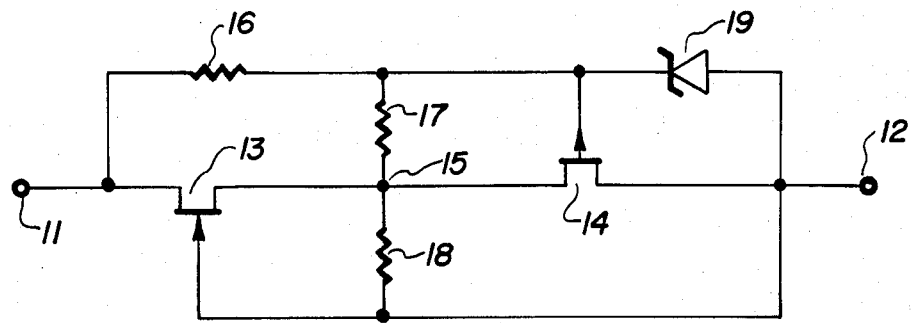
FIG. 1 shows in schematic form an embodiment of the present invention.

FIG. 1 illustrates in schematic form a two terminal series current limiter circuit. Terminal 11 and terminal 12 are the two terminals and are intended to be used to insert the protection circuit in a serial manner in any line where it is desired to limit current. Examples of such lines can be found in telecommunication systems, data communication systems, automotive systems, etc. Normal current flow will be from terminal 11 to terminal 12. Two junction field effect transistors (JFETs) 13 and 14 are shown connected in series between terminals 11 and 12. The drain electrode of transistor 13 is connected to terminal 11 while the source of transistor 13 is connected to node 15. Resistors 16 and 17 are connected in series from terminal 11 to node 15. A resistor 18 is connected from node 15 to the gate or control electrode of transistor 13. The control electrode of transistor 13 is also connected to terminal 12. Transistor 14 has its source connected to node 15 and its drain connected to terminal 12. A zener diode 19 is coupled between terminal 12 and the control electrode of transistor 14 having its anode connected to terminal 12 and its cathode connected to the control electrode of transistor 14. The control electrode of transistor 14 is also connected to a junction formed between resistors 16 and 17.

In normal operation, transistors 13 and 14 provide a low impedance path between terminals 11 and 12. Transistor 13 is an N-channel JFET while transistor 14 is a P-channel JFET. If the current flow from terminal 11 to terminal 12 increases there will be an increased voltage drop across both field effect transistors. The increased voltage drop across P-channel transistor 14 will cause the gate or control electrode of N-channel field effect transistor 13 to bias off. The gate electrode of transistor 13 can sense the voltage across transistor 14 since it is connected to the drain of transistor 14. As transistor 13 begins to turn off, more voltage is sensed by the control electrode of transistor 14 because increased current flow occurs through resistor 16. This increased current flow applies a positive voltage to the control electrode of transistor 14 thereby decreasing its current conduction. Resistors 17 and 18 serve as bias resistors to maintain transistors 13 and 14 in a non-conducting state as long as the increased voltage drop is sensed between terminals 11 and 12. Zener diode 19 serves as a protection device to limit the amount of voltage which appears at the source electrode of transistor 13 and at the gate electrode of transistor 14. This prevents damaging or destroying the field effect transistors. As the overvoltage decreases, transistors 13 and 14 will commence conducting. It should be noted that resistor 16 serves as a current source to supply a small amount of current through resistors 17 and 18. When transistor 13 is conducting normally the current flowing through resistor 16 will be shunted through transistor 13. It will be noted that a current source could be inserted in series with transistors 13 and 14 to improve the circuits sensitivity to lower currents, preferably between node 15 and transistor 14 or between terminal 12 and transistor 14.

Figure 2:
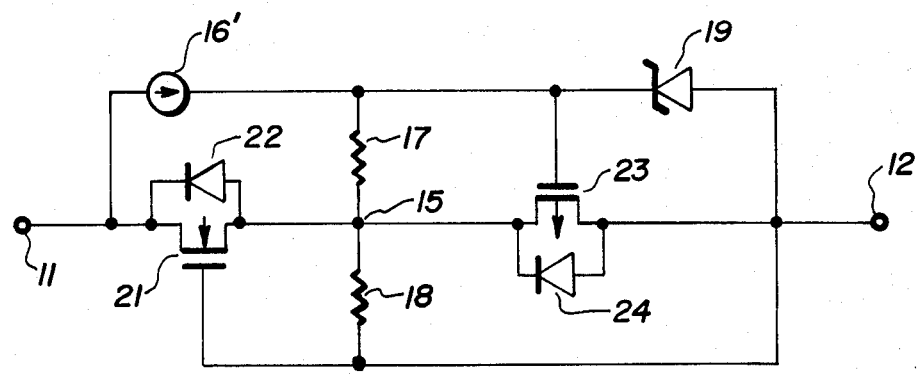
FIG. 2 shows a circuit which is slightly modified from FIG. 1.

FIG. 2 illustrates, in schematic form, an alternate embodiment of the circuit of FIG. 1. The elements of the circuit of FIG. 1 which are used in FIG. 2 carry the same reference numerals and their function will not be discussed in greater detail. Note that resistor 16 has been illustrated as a current source 16'. The main difference between the circuits of FIG. 1 and FIG. 2 is that the JFET transistors of FIG. 1 have been replaced with metal-oxide-semiconductor (MOS) power field effect transistors (FET). This should allow the circuit of FIG. 2 to withstand higher voltages than will the circuit of FIG. 1. Transistor 21 is an N-channel power field effect transistor having its drain connected to terminal 11 and its source connected to node 15. The control electrode of transistor 21 is connected to resistor 18 and to terminal 12. MOS power FETs have an inherent diode between their source and drain, which for transistor 21 is illustrated as diode 22. Diode 22 has its anode connected to the source electrode of transistor 21 and its cathode connected to the drain of transistor 21. P-channel MOS power FET 23 has its source connected to node 15 and its drain connected to terminal 12. Inherent diode 24 has its cathode connected to the source and its anode connected to the drain of transistor 23. The operation and function of the circuit of FIG. 2 is the same as that of the circuit of FIG. 1.

Figure 3:
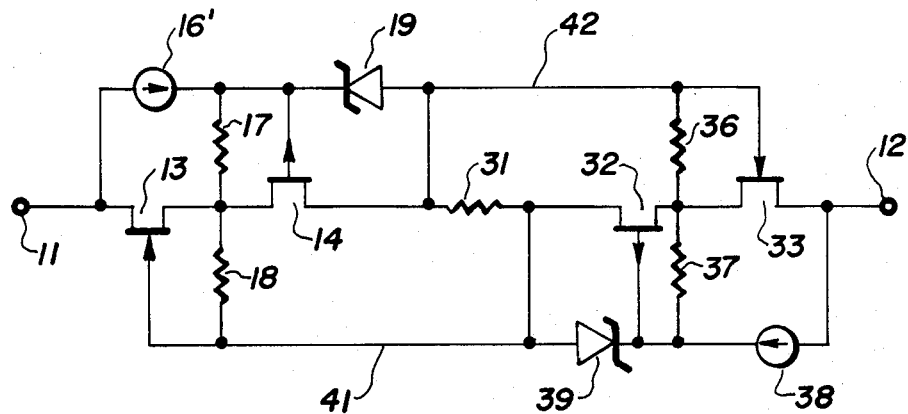
FIG. 3 shows another embodiment of the present invention.

FIG. 3 illustrates, in schematic form, a two terminal series current limiter which is bidirectional in operation. In other words, the circuit of FIG. 3 functions the same as the circuits of FIGS. 1 and 2 but will limit series current flowing in either direction. In FIG. 3, N-channel JFET 13, P-channel JFET 14, P-channel JFET 32, and N-channel JFET 33 are all connected in series between terminals 11 and 12. A resistor 31 is shown connected in series between transistors 14 and 32. Resistor 31 is used to program the current level at which the transistors will switch off thereby limiting the current flow between terminals 11 and 12. In some cases where it is desired to have the same trip point as the circuit of FIG. 1 then resistor 31 would have a value of zero ohms or in other words would be shorted out. The gate electrode of transistor 13 is coupled by line 41 to a junction formed between resistor 31 and transistor 32. Other than this connection provided by line 41, the interconnection of transistors 13 and 14 along with current source 16' and resistors 17, 18, and zener 19 are all the same as for FIG. 1. A zener diode 39 has its anode connected to the junction of resistor 31 and transistor 32 and its cathode connected to the gate electrode of transistor 32. Resistors 36 and 37 are connected in series between the gate electrodes of transistors 32 and 33. A node formed between resistors 36 and 37 is connected to a junction between transistors 32 and 33. Current source 38 is connected between terminal 12 and the gate electrode of transistor 32. The control electrode of transistor 33 is connected to the anode of zener diode 19 by line 42 and to the junction formed between transistor 14 and resistor 31.

The operation of transistors 13 and 14 is the same as previously described. The operation of transistors 32 and 33 is the same as transistors 13 and 14 when terminal 12 is the input terminal; however when terminal 11 is the input terminal, the current flow is opposite to that as explained for transistors 13 and 14. When terminal 12 is the input terminal, as the voltage drop across transistors 32 and 33 increases, the gate electrode of transistor 33 will start to sense a higher voltage dropped across transistor 32 and resistor 31 and will start to turn off. As transistor 33 turns off more current flows through current source 38 applying a bias to the gate electrode of transistor 32 thereby holding it in a non-conducting state. Before the current exceeds the trip point, transistors 13 and 14 will conduct hard, or in other words will exhibit a low impedance. In fact when voltage is first applied to the circuit wherein terminal 12 is used as the input terminal and terminal 11 is used as the output terminal, transistors 13 and 14 will exhibit a diode action. That is, once the voltage exceeds the value required to overcome the PN junction value, current limiting is preformed only by transistors 32 and 33.

The gate electrode of transistor 13 senses the voltage drop across transistor 14 and resistor 31 since line 41 connects the gate electrode to the far end of resistor 31. Line 42 does the same for the gate electrode of transistor 33 so that the voltage drop across transistor 32 and resistor 31 is sensed by the gate electrode of transistor 33. Zener diode 39 serves to protect the circuit in the same manner as zener diode 19 protects transistors 13 and 14, which was explained for FIG. 1.

It should be noted that all of the transistors shown in FIGS. 1 through 3 are depletion type transistors and will therefore be conductive without requiring a bias voltage being applied to their gate electrodes.

By now it should be appreciated that there has been provided a series current limiter circuit which has a low series resistance for normal operating voltages and currents and increased resistance when it is overstressed by voltage and/or current. The circuit will automatically reset itself, once the surge condition goes away. The circuit is applicable to protecting end terminals, telecommunication systems, data communication systems, automotive systems, or any application that requires protection of I/O lines that are subjected to a harsh environment.

Consequently, while in accordance with the patent statutes there has been described what at present are considered to be preferred forms of this invention. It will be obvious to those skilled in the art that numerous changes and modifications may be made herein without departing from the spirit and scope of the invention, and it is therefore aimed in the following claims to cover all such modifications.

I claim:

1. A series current limiter circuit having a first terminal and a second terminal, comprising:
a first field effect transistor having a first current carrying electrode coupled to the first terminal and a second current carrying electrode coupled to a node, and a control electrode coupled to the second terminal; a second field effect transistor having a first current carrying electrode coupled to the node and a second current carrying electrode coupled to the second terminal; a first resistor coupled between the node and the control electrode of the first field effect transistor; a second resistor coupled between the node and a control electrode of the second field effect transistor; a third resistor coupled between the first terminal and the control electrode of the second field effect transistor; and means for clamping a voltage coupled between the second terminal and the control electrode of the second field effect transistor.

2. The series current limiter of claim 1 wherein the first field effect transistor is an N-channel depletion type JFET and the second field effect transistor is a P-channel depletion type JFET.

3. The series current limiter of claim 1 wherein the first field effect transistor is an N-channel depletion type power MOSFET and the second field effect transistor is a P-channel depletion type power MOSFET.

4. The series current limiter of claim 1 wherein the means for clamping is a zener diode.

5. A series current limiter circuit for protecting against an overcurrent and having first and second terminals, comprising: first and second means for controllably limiting current flow therethrough, the first and second means being coupled in series between the first and the second terminal; a current source for sourcing a limited amount of current coupled in parallel with the first means; a first resistance coupled in series with the current source; and a second resistance coupled in parallel with the second means.

6. A circuit for limiting current flow in both directions between a first and a second terminal, comprising: first, second, third and fourth field effect transistors all coupled in series between the first and second terminals, and forming a first node between the first and second field effect transistors and a second node between the third and fourth field effect transistors; a first resistance coupled between the second and third field effect transistors and having a first end coupled to the second field effect transistor and a second end coupled to the third field effect transistor; a first current source for supplying a low current coupled in parallel to the first transistor; and a second current source for supplying a low current coupled in parallel with the fourth transistor.

7. The circuit of claim 6 further including a second resistance coupled in series with the first current source, and the control electrode of the second field effect transistor connected to a junction formed by the first current source and the first resistance; a third resistance coupled between the first node and the control electrode of the first field effect transistor, the control electrode of the first field effect transistor also being connected to the second end of the first resistance; a fourth resistance coupled between the second node and the control electrode of the fourth field effect transistor, the control electrode of the fourth field effect transistor also being connected to the first end of the first resistance; a fifth resistance coupled in series with the second current source; a first voltage clamp coupled between the control electrode of the second field effect transistor and the first end of the first resistance; and a second voltage clamp coupled between the control electrode of the third field effect transistor and the second end of the first resistance.

* * * * *